United States Patent [19]

Loye et al.

[11] 4,416,940

[45] Nov. 22, 1983

[54] SIMULATED WEATHERED-COPPER COATINGS FOR METAL

[75] Inventors: Kenneth Loye, Lakewood; Gary Julian, Parma, both of Ohio

[73] Assignee: SCM Corporation, New York, N.Y.

[21] Appl. No.: 325,653

[22] Filed: Nov. 30, 1981

[51] Int. Cl.[3] ........................ B32B 5/16; B32B 19/02; B32B 27/20; B05D 5/06

[52] U.S. Cl. .................................. 428/324; 427/267; 427/380; 427/407.1; 427/409; 428/328; 428/913

[58] Field of Search ............ 427/267, 380, 409, 407.1; 428/204, 212, 213, 324, 328, 913, 688, 454, 421, 461

[56] References Cited

U.S. PATENT DOCUMENTS 2,104,790 1/1938 Casto ............................ 428/204 X

OTHER PUBLICATIONS

*Modern Metals* 32(4): pp. 37–38 May 1976.

Fredericks, B., *A Bright Alternative to Metallic Finishes,* Product Finishing, p. 54 Aug. 1981.

Bachhouse, A. J., *Routes to Low Pollution Glamour Metallic Automotive Finishes,* J. Coatings Technology, 54(693): pp. 83–90 Oct. 1982.

U.S. 4,220,679, *Coating Process,* A. J. Bachhouse, Abstract in *Official Gazette Sep. 2, 1982.*

*Primary Examiner*—Evan K. Lawrence
*Attorney, Agent, or Firm*—A. Joseph Gibbons; Merton H. Douthitt

[57] ABSTRACT

Processes for the application of new water-reducible and solvent-based coatings to various substrates to simultaneously impart copper-like metal and patina coloration to achieve a simulated weathered copper appearance are described, as well as the articles produced thereby. The coatings are preferably applied to a primed metal substrate, especially coil coating stock, in a two-step process comprising a first application of a base coat containing a dominant patina-color-producing colorant followed by application of a top coat applied to the cured base coat, the top coat containing a copper-color-producing colorant. After final cure, the substrate exhibits both a copper metallic appearance by reflection of incident light from the top coat and a patina appearance by transmission of light to and reflection from the base coat.

13 Claims, 1 Drawing Figure

SIMULATED WEATHERED-COPPER COATINGS FOR METAL

BACKGROUND OF THE INVENTION

The present invention relates to a process for application of coatings to a substrate to impart a simulated weathered-copper appearance and articles produced thereby. The process may utilize water-reducible and solvent-based "visulescent" (defined below) coatings which result in the perception of color effects dependent on viewing angle or the angle of incident light. In the decorative architectural and building trades, copper metal, usually in the form of sheet copper, has enjoyed a continuing acceptance since ancient times to the present with architects and builders. Both historical landmarks and modern architecture utilize copper panels because of its favorable weight, strength, formability and aesthetic appeal. External copper as a building component is widely used for external purposes in siding, roofing and structural components. More recently, additional applications have been found to supply imaginative, decorative applications for internal purposes. Architects are constantly developing new techniques for using copper, including the concept of laminating copper to other materials, such as plywood and asbestos.

Copper sheet and metal applications are unique in that the fresh metallic copper appearance changes on aging and exposure. Weathered-copper proceeds through multiple changes each affording a different color perception. These various colors of copper enhance the structures on which it is used and provides a distinctive character thereto. Copper, when exposed to the elements, passes through various brown and green shades and ultimately weathers to a blue-green or gray-green color, a process which takes five to fourteen years. The brown shades are called "statuary finishes" and the green shades are called "patinas." Statuary finishes (metal to brown) can be maintained somewhat by application of raw linseed oil. Patina finishes depend on the weathering property of copper and occur over many years of aging. Solutions to treat the copper substrate have been used to accelerate the patina development but have not proven entirely satisfactory. Research programs to develop reliable artificial patinating techniques are ongoing. The instant process relates to a process for imparting the desirable weathered-copper appearance to various substrates which overcomes the undesirable aspects of metallic copper. Such coated substrate can readily be used in place of the metal sheeting and yet provide the aesthetic copper metal and patina appearances which are immediate, relatively permanent and are not dependent on weathering.

Although the prior art teaches coatings containing metal powders, Applicants are aware of no coatings that approach the process of the instant invention or of any metal substrate having the unique characteristics of those shown herein. It is known in the art that coatings pigmented with copper powders can be treated to provide a weathered appearance; these methods depend on the further treatment of such coated panels with acids and other chemicals which attack the copper particles in the coating to oxidize them in a manner akin to the external weathering of sheet copper. Such articles exhibit only the weathered appearance and unlike those of the instant invention are subject to continuing degradation due to atmospheric and oxidative conditions. The instant coating and process has overcome the deficiencies of the prior art materials.

SUMMARY OF THE INVENTION

It is an object of the present invention to provide a coated substrate which will be a useful substitute for copper sheeting and panels for use in the architectural and building industry and provide the aesthetic effect of copper without the inherent disadvantages of said copper materials. A further object is to provide a process for coating a substrate, especially metal substrate, whereby a finish is applied to the substrate thereby imparting a weathered-copper appearance to the substrate.

A further object relates to a two-step process for imparting a simulated weathered-copper appearance to a substrate which comprises first applying an opaque pigmented base coat containing a dominant patina-color-producing colorant to a primed or unprimed substrate; curing said base coat; applying a second non-opaque top coat containing one or more copper-color-producing additives in an amount sufficient to impart a simulated weathered-copper appearance having both a copper metallic appearance by reflection of incident light from the top coat and a patina appearance by transmission of light to and reflection from the base coat with perception of the various color effects being dependent on the viewing angle or the angle of incident light.

Another object relates to the coating of a metal substrate, especially a coil coating stock according to the above-described process wherein said base coat comprises at least one film-forming binder, an organic carrier for said binder, an opacifying agent, pigment and other additives sufficient to impart desirable coating characteristics including hiding power, weatherability, opaqueness, and patina color; and wherein said top coat comprises at least one film-forming binder, an organic carrier for said binder and at least one copper-color-producing additive.

A yet further object relates to articles coated with the instant compositions according to said process including metal objects such as coil coatings and metal roof and siding panels whereby said articles will have the aesthetic weathered-copper appearance, be useful as a building and/or decorative material in place of copper metal and copper sheeting, but advantageously not be subject to continued weathering and thus having a permanence with regard to surface characteristics and color.

DETAILED DESCRIPTION OF THE INVENTION

Figure 1:
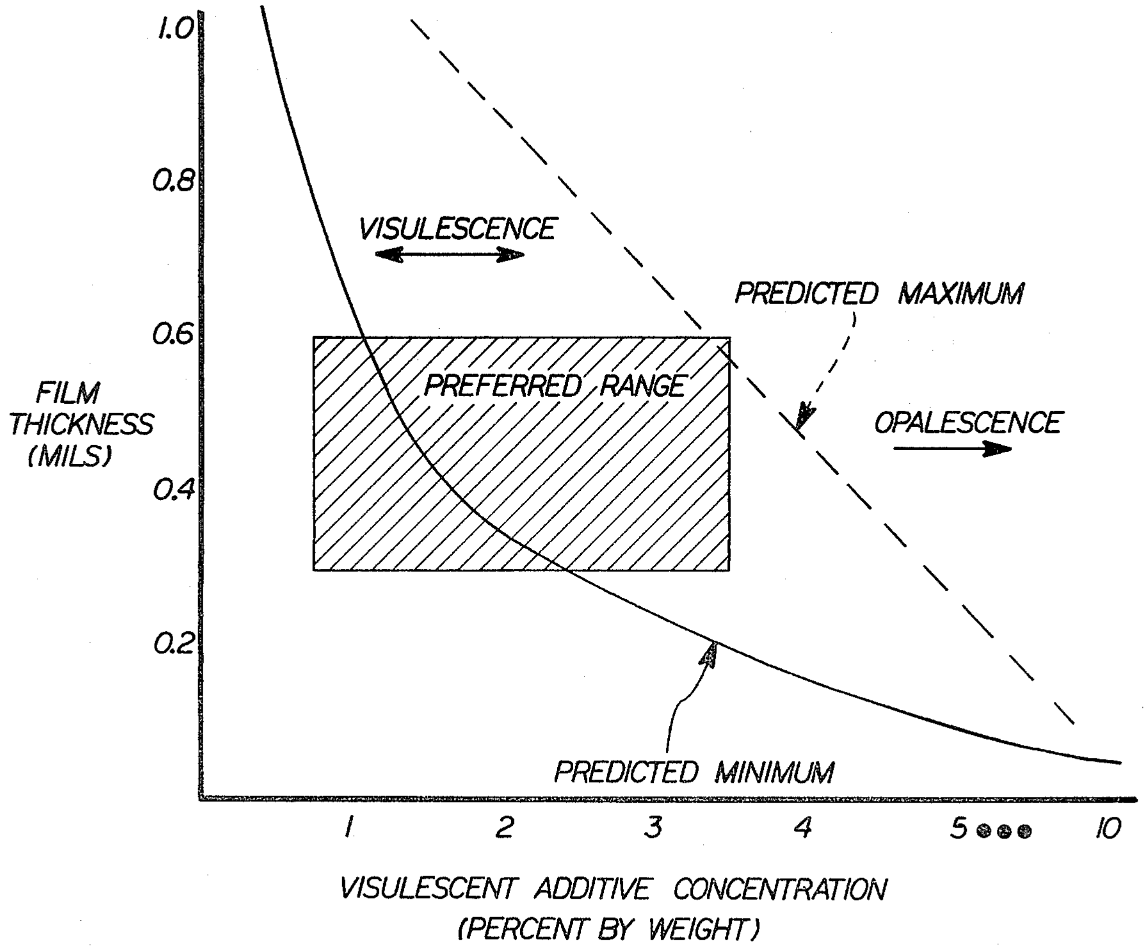
FIG. 1 shows workable and preferred ranges for the top coat parameters in the process of the invention.

In the instant process, the coatings, which provide a decorative copper-like weathered appearance, are applied to substrates via conventional coating techniques, as for example, spray, brush coat, flow coat, dip coat, roll coat, etc. The substrates can be a primed or non-primed wood, metal, glass, plastic, fiber reinforced plastic such as styrene, copolymers of styrene, polypropylene, and the like.

These coatings are especially suited for exterior finishes for metals such as coil coating, siding, and roofing shingles.

After each multi-step application of base coat and top coat applied to a substrate such as a metal coil or roof shingle which has been previously primed, the substrate may be cured by conventional techniques to produce a film thereon having excellent characteristics including flexibility and adhesion with good resistance to humidity, salt spray, light, chalking, and organic solvent.

The coating is advantageously applied to siding, steel panels or venetian blind stock in a continuous process. After each application, the coated panel is subjected to a rapid cure schedule for about 20 to 40 seconds to achieve a peak metal temperature cure of about 400°-500° F., followed by rapid water-quench cooling. An alternative cure method involves heating the coated stock at 375° F. for twenty minutes followed by cooling by water spray or water quench.

The instant invention for imparting a weathered-copper appearance to a substrate, and preferably a metal such as coil coating stock for roofing and siding applications, depends on the unique multicoating process whereby a substrate, preferably primed in advance, is first treated with a specific base coat. The base coat which contains usual ingredients in such coatings must result in an opaque coating and must have the necessary dominant colorants to provide the dominant patina color which will be observed in the final object by transmission. In addition to vehicle and colorant, the base coat will be formed from suitable film-forming binders which provide the necessary properties to the coating on application such as flow and on curing the permanence to afford considerable resistance against weathering and oxidative and light stability. Of course the dominant pigment and vehicle, binder and paint additives must be compatible one with another as well as being compatible with the diverse second coat to be applied over the cured first coat. It is essential that the base coat be essentially opaque and non-transparent so that the dominant patina can be projected as a transmitted color. Similarly it is critical that the top coat be non-opaque and substantially transparent to allow perception of the dominant patina color of the base coat. To produce the desired patina coloration, pigments having the dominant colors green, blue, gray, and mixtures are useful. It is recognized that a true patina color can be any of a number of intermediate shades ranging from green to blue. A prominent blue patina may provide a more aesthetic appearance for roofing panels usually observed from a distance whereas a more prominent green or gray-green patina will be more desirable for decorative purposes and panels and objects to be visually observed at close range.

Suitable base coatings in accordance with this invention require an extremely finely divided patina-color-producing pigment or colorant having an average particle size of 10 microns or less. In the base coat the primary colorant usually comprises from about 4 to about 30 weight percent of the coating, the remainder being binder, usually paint additives, carrier solvent, processing and leveling agents, fillers, and opacifying pigments.

Separately formulated base coats and formulated top coats are available from the Glidden Coatings & Resins Division of SCM Corporation, Cleveland, Ohio. For the practice of the instant invention, film-forning binders selected include one or more or the commercially available thermoset resins used in conjunction with one or more typical vehicles, the binder and vehicle being selected in type and properties dependent on whether the vehicle is an organic type vehicle or whether the coatings are aqueous based coatings either latex type or water dispersible.

Suitable binders can be formulated from commercially available resins such as vinyls, halogenated vinyls, polyhalogenated vinyls, styrenes, acrylics, polyesters, urethanes, and mixtures thereof. Especially preferred binders for solvent base systems are polyvinylidene fluoride resins because of their excellent durability and weathering characteristics. Usually a combination of resins will be selected to provide an optimum mixture providing both weathering and film-forming characteristics. Such combination of binders are well known in the art. An especially preferred combination includes mixtures of polyvinylidenefluoride resin and acrylate type resins. Mixtures of binder advantageously contain about 50 to about 80 and preferably 65-70 weight percent polyvinylidene fluoride and from about 20 to about 50 and preferably about 30 to 35 weight percent acrylic resin.

For various purposes and especially where the coated panels and substrate are to be used externally, a primer coat of a suitable primer should be applied and cured before application of the multicoat system of this invention. For metal or steel stock, conventional primers such as DEXTER 165 (Dexter Midland Corporation), AQUALURE, PPG3305 (PPG Industries), and similar primers are satisfactory. Especially preferred primers used in the embodiments herein include the non-corrosive primers and preferably commercial primers known and marketed by Glidden as AQUALURE primers.

The top coat is similarly critical to the production of the finished coating and to the simulated weathered-copper appearance, said total appearance having both a copper metallic appearance when viewed by reflected light and a patina appearance by transmitted light. As noted above, it is critical that the top coat be essentially non-opaque and substantially transparent in order to allow perception of the dominant patina color of the base coat. In a preferred embodiment, the top coating contains a visulescent additive sufficient to insure that the coated substrate exhibits visulescence; that is, the coated object appears to exhibit different colors depending on the visual angle (plane) of observation and/or on the angle of incident light impinged thereon. A visulescent additive, colorant, or pigment, sometimes used interchangeably herein, is any additive that when formulated in critical amount in a multiple coating system produces a visulescent effect.

In order for the top coat to satisfy the novel function required to produce a weather-resistant simulated weathered-copper-colored coating, there are two parameters that are interrelated and that must be critically controlled. Such top coats require a visulescent additive, preferably a solid matter with suitable properties capable of reflecting visible light and also capable of transmitting visible light. Such additive must be a copper-color-producing additive so that the coating will produce a copper coloration by reflection and yet allow light to pass through and be transmitted to the dominant undercoat so that it can be reflected therefrom to produce the diverse patina color.

The top coat may be formulated from the same resin binder as used in the base coat or may utilize a different binder system compatible therewith. Preferably the top coat will contain mixtures of the film-forming resins. It is preferred to use the same resin system in the top coat, but such total system must differ from the base coat in various aspects. The top coat cannot be opaque and hence must not contain fillers, pigments or other additives that would make the top coat opaque. Impinged light must be able to transverse the top coat and thus allow the multiple color effect of the instant invention.

The two related parameters to satisfy the top coat requirement and provide the visulescent coating are the film thickness and the concentration of the copper-color-producing additive. Many combinations of these parameters will allow for the novel coatings of the instant invention. Although the inventors do not desire to be bound thereby, the FIG. 1 graphically depicts workable and preferred ranges for these parameters. Referring to FIG. 1, it is seen that the desirable properties are expected when the top coat film thickness is varied from about 0.1 mil to about 1.0 mil and preferably in the range of about 0.3 to 0.6 mil and when the copper-color-producing additive concentration is varied between about 0.50 and about 6.0 weight percent, basis total weight of top coat, preferably 0.75 to about 3.5 weight percent. These parameters will obviously change to some degree with the choice of copper-producing additive. When the pigment concentration is increased beyond the maximum, the visulescent effect will be replaced by a type of opulescence or pearl effect. In this condition, the color produced in the top coat by reflection is dominant over the color resulting from the base color by transmission. Thus when a thinner coating is applied, the additive concentration may be increased and visa versa when the additive concentration is low, a heavier top coat may be applied.

The additives which can provide the visulescent characteristics and the copper-color required in the instant invention include a large number of products known to the coating art and include pigments known in the trade as iridescent pigments. Such additives include finely divided elemental metal materials including copper and bronze preferably in the form of a powder, but sometimes in other forms such as for example prisms, plates, pellets and even combinations thereof. Such pigments are oft-times treated with a chemical treating agent such as for example a metal salt of a long chain saturated or unsaturated, organic acid, i.e., sodium stearate, which can render them more suitable for the instant purposes. In addition to metallic pigments, other useful materials that exhibit some or all of the desirable properties required for the instant invention include variously treated micas. Preferred are the MEARLIN® (The Mearl Corporation) Luster Pigments especially the copper and bronze variants which can be used separately or in combination. These pigments are said to differ from conventional pearlescent pigments in that they have been given a special chemical treatment (see U.S. Pat. No. 4,134,776). Especially preferred are the micas treated with $TiO_2$, zirconium oxide, iron oxide, carbon black and mixtures thereof particularly those that are non-copper-containing micas yet provide a copper metallic appearance in accord with the instant invention. Thus the invention is not limited to copper-containing pigments. A number of useful copper-color-producing additives are exemplified in the following patents and these are specifically incorporated herein by reference. Such patents include: U.S. Pat. Nos. 3,071,482; 3,087,828; 3,711,308; 3,840,381; 3,874,890; 3,861,946; 3,915,733; 3,926,659; 3,951,679; 3,980,491; 3,985,571; 4,010,293; 4,017,326; 4,038,099; 4,040,859; 4,134,776; 4,146,403; and similar patents.

Preferred coatings are prepared from finely divided copper pigments and/or suitable mica additives treated with a titanium dioxide and/or an iron oxide. Bronze powders containing sufficient copper and zinc metals will also produce a wide range of copper-like colorations ranging from gold to copper colors. The coatings produced in the instant invention are not dependent on after-treatment of the coated substrate following cure. The instant coatings when applied to metal stock provide a relatively permanent color and coating which is not subject to the weathering variables of the copper metal and copper sheets. Panels colors having a wide range of copper colors can be produced; non-weathered effects, intermediate weathered effects, and advanced weathered effects can be made to specification.

For purposes of metal shingles, siding and roof coating, commercially available gold, bronze, and copper-colored additives having an average particle size of about 30 microns or less and preferably of about 10 micron size are recommended. When substantial amounts of particles of larger than 30 microns are present in the powder, the coatings tend to have unacceptable Hegman grind values and give unsatisfactory seed appearance.

The best mode water-based coatings can be prepared from non-copper-containing treated mica such as commercially available MEARLIN® Antique Copper Luster Pigment used in conjunction with a commercially available acrylic latex base coat and top coat, as for example, Pigmented and Non-Pigmented AQUALURE™ 1000; AQUALURE 3000 and AQUALURE 5000. It is anticipated that a wide range of acrylic latexes will be suitable in the practice of this invention.

Referring to the copper-color-producing additive, it is postulated that to be most effective in the practice of this invention, the additive must have an average particle size of about 30 microns or less and preferably in the range of about 10 to 30 microns. When the additive is a metallic additive such as copper powder, it is desirable to use powder having a leaf content of at least about 50 percent leaf particles with most desired compositions having an average particle size in the range of 5 to 20 microns and a leaf content of 65 percent.

Organic-based coatings and aqueous-based coatings can advantageously use various polymer resin systems; e.g., those made from polymers of methacrylic acid, acrylic acid, and their mixtures, copolymers and terpolymers of methacrylic acid esters with styrene and/or vinyl acetate, or copolymers and terpolymers of methacrylic acid and esters with acrylic acid and esters and/or acrylonitrile.

Also useful are polyvinyl chloride, particularly those plasticized with conventional plasticizers such as 2-ethyl hexanol or 2-ethoxyethanol-1 and latices of copolymers of vinyl and vinylidene chloride and vinylidene fluoride. Aqueous emulsions of alkyd resins and modified alkyds are also useful.

Although homopolymer acrylate binders can be used to form the coatings of this invention, usually combination of various acrylate and other binders provide better physical properties to the final coating in film form as applied to a substrate. Suitable binders include acrylate polymers and acrylic type polymers formed from other vinyl compounds including vinyl chloride and acetate; especially preferred are polymerized esters of acrylic acid or its homologs, e.g. methyl methacrylate, ethyl methacrylate, propyl methacrylate, butyl methacrylate, octyl methacrylate, polymerized styrene, polyhydric alcohol-polybasic acid resins. Interpolymers of two or more of such compounds and mixtures of such resins can also be used as suitable binders.

For organic-based systems advantageous binder systems include polyesters, silicon polyesters, vinyls, urethanes and the like. Preferred system incorporated polyvinylidene halides especially polyvinylidene fluoride and most preferred systems because of their enhanced durability to external conditions and climates are the multiple binder systems which have a major portion of polyvinylidene fluoride used in conjunction with a lesser portion of a different thermoset binder, such as, for example, acrylic binders.

Suitable emulsion systems include those of vinyl resins by which we mean to include vinyl acetate, vinyl chloride, vinylidene chloride, and the like; those of hydrocarbon polymers and copolymers, polyethylene, polypropylene and oxygenated or halogenated derivatives of same by which we mean to include polybutadiene, oxygenated polybutadiene polyisoprene, oxygenated polyisoprene, butadiene-styrene, butadiene-vinyl toluene, isoprenestyrene and the like; acrylic latices by which we mean to include polymers and copolymers containing units of acrylic acid, methacrylic acid, their esters, and acrylonitrile; alkyds; reaction products of vinylic hydrocarbon monomers with unsaturated materials such as the reaction product of maleic acid with styrene.

Most preferred aqueous systems are those formulated from water-reducible acrylic thermoset coatings used in conjunction with non-copper-containing treated mica pigments.

The composition of this invention may contain any number of other additives usually used in such coatings including coloring pigments, extender pigments, driers, bodying agents, stabilizers, defoamers, preservatives and the like. Additional additives serving to promote suitable dispersion of the metal powders in conjunction with the other agents described above can be any of the common surfactants and/or wetting agents used in paint formulation.

The coating may be applied to the substrate in the usual manner including reverse rollcoating; spray; direct rollcoat; electrostatic and handbrushed methods. In a continuous process, the coating is applied to residential siding, steel panels or venetian blind stock. After application, the coated panel is subjected to a rapid cure schedule for 30–40 seconds at 470° F. (peak metal temperature), followed by rapid cooling in a water quench. An alternate cure method involves heating at 375° F. for twenty minutes followed by water quench or water spray.

The various criteria for evaluating coatings of the instant invention useful for imparting a copper color to various substrate particularly roof shingles and siding are outlined broadly as follows Flexibility Test: Flexibility is determined by observing cracking and tear-off observed on a single band of the panel. Cracking is rated 0–10; values of 9 or above very acceptable. Tear-off (complete removal of coating using clear cellophane tape) is rated 0 (no removal) to 100 (100% tape off).

Pencil Hardness: After a specimen has been conditioned for twenty-four hours in a thermo-hydrostated chamber at a temperature of 20°±1° C. and a relative humidity of 75±3%, it is set horizontally in the chamber and scratched with a sharpened pencil. Th value is expressed by the hardness of the hardest pencil which cannot make a scratch on the coated surface. B hardness values are satisfactory with progressive values B→ HB→ F→ 1H→ 2H→ 3H are most desirable. F values of pencil hardness are very satisfactory.

Reverse Impact: After a weight is dropped on the back of the panel, cracking and tear-off are recorded as indicated above.

Carbon Arc Weatherometer: An accelerated weathering test consists of subjecting the coated panels to a water spray in a weatherometer whereby the panels while being rotated are subjected to definite intermittent cycles of water spray and light (ultraviolet). An acceptable coating will withstand over 1,000 hours of weathering and superior coating will show very little deterioration at 2,500 hours.

MEK Resistance Test: A cloth soaked with methyl ethyl ketone is stroked upon the coating surface using finger pressure. The number of strokes to failure of the coating is observed and recorded. Values of 50 rubs or better are acceptable values.

The following examples are intended to illustrate the invention but not to limit the scope thereof, parts and percentages being by weight and temperature in degrees Fahrenheit unless otherwise indicated.

EXAMPLE 1

SOLVENT BASED COATING

A galvanized steel panel was first treated with a 0.30 mil coating of AQUALURE Primer 631-L-128 (Glidden Coatings & Resins). Following cure an opaque green base coat of VISULURE™ No. 307-Green (Glidden) was applied using a #38 draw down wire, was oven cured at 470° F. and water quenched to yield an opaque patina colored coating of 0.80 mil thickness. Thereafter, a non-opaque top coating VISULURE™ M-301 (prepared from the same binder as base coat but having no opacifying pigment) containing 3.5 percent by weight MEARL® (Mearl Corporation) Antique Copper Pigment Luster Pigment is deposited using a draw down wire, oven cured at 470° F. peak metal temperature and water quenched to give a 0.3 mil thick top coat. The resulting panel exhibited a simulated weathered-copper appearance estimated to be equivalent to that of a 10-year weathered copper sheet and as an overtone exhibited a copper metallic appearance in reflected light.

The coated panels were analyzed using a Match-Scan (Diano Corporation) Scanning Spectrophotometer having polychromatic illumination from a tungsten source lamp diffused by an integrating sphere with 6.5-degree viewing.

| DIFFUSED WAVE LENGTH IN NANOMETERS | PERCENT REFLECTANCE | | |
|---|---|---|---|
| | BASE COAT | BASE COAT AND TOP COAT | HEAVY TOP COAT |
| 400 | 20.45 | 15.55 | 12.50 |
| 420 | 24.75 | 18.26 | 14.34 |
| 440 | 26.93 | 19.62 | 15.14 |
| 460 | 30.19 | 21.60 | 16.33 |
| 480 | 33.03 | 23.23 | 17.45 |
| 500 | 35.26 | 24.62 | 18.45 |
| 520 | 37.09 | 25.93 | 19.51 |
| 540 | 37.64 | 26.69 | 20.39 |
| 560 | 35.08 | 26.28 | 21.03 |

-continued

| DIFFUSED WAVE LENGTH IN NANOMETERS | PERCENT REFLECTANCE | | |
|---|---|---|---|
| | BASE COAT | BASE COAT AND TOP COAT | HEAVY TOP COAT |
| 580 | 31.12 | 25.43 | 21.69 |
| 600 | 29.28 | 25.34 | 22.48 |
| 620 | 26.90 | 24.31 | 22.13 |
| 640 | 26.41 | 24.40 | 22.41 |
| 660 | 26.03 | 24.45 | 22.65 |
| 680 | 25.14 | 24.05 | 22.59 |
| 700 | 25.98 | 24.97 | 23.51 |
| Tristumulus X | 28.71 | 23.31 | 19.76 |
| Tristumulus Y | 33.57 | 25.57 | 20.71 |
| Tristumulus Z | 32.19 | 23.11 | 17.62 |
| YI Index | 18.781 | 23.448 | 27.935 |
| L* | 6.08 | 7.93 | 9.60 |

*Visually it was observed that the Visulescent effect of the weathered copper-colored panel would essentially disappear on the application of a much heavier top coat (Column 3 above).

The standard Flexibility Test gave a 2T rating with no cracking, no tape off and exhibited a F pencil hardness (Eagle Turquoise). The resin binder system in the top coat and base coat is a mixture of 70 percent polyvinylidene fluoride and 30 percent acrylic resin. It is noted that the Mearl Pigment used in this Example contains no metallic copper.

EXAMPLE 2

WATER BASED COATING

In addition to solvent based coatings, the instant process can be used as a water-reducible coating to coil coating stock.

A 24-gauge galvanized steel panel is first treated with an 0.25 to 0.35 mil coating of AQUALURE TM (Glidden) 128 corrosion resistant primer. After curing, an acrylic latex opaque base coat of AQUALURE 3000 (Glidden) pigmented with a blue-green inert colorant is applied by draw down #26 followed by oven curing at 435° F. peak metal temperature and water quenched to give an opaque patina-like coating of about 0.9 mil thickness. Thereafter a non-opaque top coat consisting of unpigmented AQUALURE 3000 containing 3.5 percent by weight MEARL® Antique Copper Luster Pigment (Mearl Corporation) is deposited using a #12 draw down wire, oven cured at 435° F. and water quenched to give a 0.4 mil thick top coat. The resulting panel will give a simulated weathered copper patina color estimated to be equivalent to a copper sheet weathered 6 to 8 years and as an overtone will exhibit a copper metallic appearance in reflected light.

EXAMPLE 3

When the procedure of Example 1 is repeated but the polyvinylidene/acrylic binder system is replaced by an equivalent weight amount of a silicone polyester resin binder, the coated panel will exhibit a simulated weathered copper appearance similar to that produced in Example 1. This product will be especially suitable for external building uses.

EXAMPLE 4

When the procedure of Example 1 is repeated using a urethane formulated binder, a satisfactory coating having a weathered-copper appearance will be obtained.

EXAMPLE 5

When the procedure of Example 1 is repeated using a finely divided copper metallic pigment, OBRON SF-50 UP (trademark of Obron Corporation, 98.5% through 200 screen) having a leafing value of greater than 50 percent, in place of the non-copper-containing additive, a coated panel exhibiting a weathered-copper appearance similar to that obtained in Example 1 will be produced.

What is claimed is:

1. A two-step process for imparting a simulated weathered-copper appearance to a substrate which comprises first applying an opaque pigmented base coat containing a dominant patina-color-producing colorant to a primed or unprimed substrate; curing said base coat; applying to the cured base coat a non-opaque top coat containing one or more copper-color-producing additives in an amount sufficient to impart a simulated weathered-copper appearance having both a copper metallic appearance by reflection of incident light from said top coat and a patina appearance by transmissiion of light to and reflection from the base coat; said top coat having sufficient transparency toward incident light to allow perception of the patina color of the base coat and simultaneously sufficient copper-color producing additives to allow the reflection of light from the copper-color-producing additives.

2. A process according to claim 1 wherein said base coat comprises at least one film-forming binder, an organic carrier for said binder, an opacifying agent, the dominant colorant is a green pigment and other additives sufficient to impart desirable coating characteristics including hiding power, weatherability, opaqueness and patina color; and wherein said top coat comprises at least one film-forming binder, an organic carrier for said binder and at least one copper-color-producing additive.

3. A process according to claim 1 or 2 wherein the copper-color-producing additive is selected from the group consisting of an ultrafine metallic powder, treated mica, and mixtures thereof.

4. A process according to claim 3 wherein the film-forming binder consists of a thermoset resin selected from the group consisting of vinyls, styrenes, halogenated vinyls, acrylics, polyesters, urethanes and mixtures thereof.

5. A process according to claim 4 wherein the film-forming binder is a polyvinylidene fluoride resin.

6. A process according to claim 4 wherein the film-forming binder comprises a mixture of polyvinylidene fluoride and an acrylic resin.

7. A process according to claim 6 wherein the film-forming binder comprises from about 50 to 80 weight percent polyvinylidene fluoride and from about 20–50 weight percent acrylic resin.

8. A process according to claim 6 wherein the treated mica is a non-copper-containing mica.

9. A process according to claim 1 wherein said base coat comprises at least one film-forming binder, an aqueous carrier for said binder, an opacifying agent and other additives sufficient to impart desirable coating characteristics including hiding power, weatherability, opaqueness and patina color; and wherein said top coat comprises at least one film-forming binder dissolved or dispersed in an aqueous carrier and at least one copper-color-producing additive.

10. A substrate coated according to the process of claim 1 wherein the substrate is selected from the group consisting of wood, metal, plastic, glass, ceramic and cement.

11. A coated coil article comprising stock steel metal having an acrylic primer coat and further coated by the process of claim 6.

12. A process according to claim 6 wherein the copper-color-producing pigment is a mica treated with one or more additives comprising a material selected from the group consisting of carbon black; metal oxides of titanium, zirconium, iron, and mixtures thereof.

13. A process according to claim 6 wherein the copper-color-producing additive is a finely divided metal powder which has been treated with a leafing composition.

* * * * *